United States Patent
Liu et al.

(10) Patent No.: US 12,557,099 B2
(45) Date of Patent: Feb. 17, 2026

(54) DEFAULT BEAM DETERMINATION IN CROSS-CARRIER SCHEDULING

(71) Applicant: Lenovo (Beijing) Ltd., Beijing (CN)

(72) Inventors: Bingchao Liu, Changping District (CN); Chenxi Zhu, Haidian District (CN); Wei Ling, Changping (CN); Yi Zhang, Chao Yang District (CN)

(73) Assignee: Lenovo (Beijing) Ltd., Beijing (CN)

( * ) Notice: Subject to any disclaimer, the term of this patent is extended or adjusted under 35 U.S.C. 154(b) by 760 days.

(21) Appl. No.: 17/920,783

(22) PCT Filed: Apr. 23, 2020

(86) PCT No.: PCT/CN2020/086324
§ 371 (c)(1),
(2) Date: Oct. 22, 2022

(87) PCT Pub. No.: WO2021/212397
PCT Pub. Date: Oct. 28, 2021

(65) Prior Publication Data
US 2023/0164780 A1     May 25, 2023

(51) Int. Cl.
*H04W 72/1273* (2023.01)
*H04W 72/23* (2023.01)

(52) U.S. Cl.
CPC ....... *H04W 72/1273* (2013.01); *H04W 72/23* (2023.01)

(58) Field of Classification Search
CPC .......................... H04W 72/1273; H04W 72/23
USPC ........................................................ 370/329
See application file for complete search history.

(56) References Cited

U.S. PATENT DOCUMENTS

| | | | |
|---|---|---|---|
| 2020/0322944 A1* | 10/2020 | Soriaga | H04W 72/542 |
| 2022/0039072 A1* | 2/2022 | Babaei | H04L 5/0053 |
| 2024/0098521 A1* | 3/2024 | Gao | H04W 16/28 |

FOREIGN PATENT DOCUMENTS

| | | |
|---|---|---|
| CN | 111010890 A | 4/2020 |
| WO | 2019137509 A1 | 7/2019 |
| WO | 2019184697 A1 | 10/2019 |

OTHER PUBLICATIONS 20932403.7 , et al., "Extended European Search Report", EP Application No. 20932403.7, Jan. 3, 2024, 8 pages.
Moderator (Oppo), "FL summary #2 for Multi-TRP/Panel Transmission", 3GPP TSG RAN WG1 #100bis, R1-2002730, e-Meeting, Apr. 2020, 50 pages
Vivo , "Discussion on remaining issues on multi-TRP operation", 3GPP TSG RAN WG1 #100bis, R1-2001678, e-Meeting, Apr. 2020, 17 pages.
202080100064.2 , "Foreign Office Action", CN Application No. 202080100064.2, May 22, 2024, 13 pages.

(Continued)

*Primary Examiner* — Hermon Asres
(74) *Attorney, Agent, or Firm* — FIG. 1 Patents (57) ABSTRACT

Methods and apparatuses for determining default beam (s) are disclosed. A method comprises receiving a control signal scheduling or triggering a downlink signal, wherein the control signal is received on a first carrier, the downlink signal is received on a second carrier, the first carrier is different from the second carrier; and determining a default TCI state for reception of the downlink signal according to a higher layer parameter CORESETPoolIndex if the scheduling or triggering offset is less than a threshold.

6 Claims, 3 Drawing Sheets

(56) References Cited

OTHER PUBLICATIONS

CMCC, "Remaining issues on multi-TRP/panel transmission", 3GPP TSG RAN WG1 #100bis, R1-2002212, e-Meeting [retrieved Oct. 24, 2022]. Retrieved from the Internet <https://www.3gpp.org/ftp/TSG_RAN/WG1_RL1/TSGR1_100b_e/Docs/>., Apr. 2020, 6 Pages.
Moderator (Oppo), "FL summary for Multi-TRP/Panel Transmission", 3GPP TSG RAN WG1 #100bis, R1-2002406, e-Meeting [retrieved Oct. 24, 2022]. Retrieved from the Internet <https://www.3gpp.org/ftp/TSG_RAN/WG1_RL1/TSGR1_100b_e/Docs/>., Apr. 2020, 34 Pages.
PCT/CN2020/086324, "International Preliminary Report on Patentability", PCT Application No. PCT/CN2020/086324, Nov. 3, 2022, 5 pages.
PCT/CN2020/086324, "International Search Report and Written Opinion", PCT Application No. PCT/CN2020/086324, Feb. 1, 2021, 6 pages.
Zte, "Maintenance of enhancements on multi-TRP transmission", 3GPP TSG RAN WG1 Meeting #100-e, R1-2000239, e-Meeting [retrieved Oct. 24, 2022]. Retrieved from the Internet <https://www.3gpp.org/ftp/tsg_ran/WG1_RL1/TSGR1_100_e/Docs>., Mar. 2020, 12 Pages.
"Notice of Decision to Grant", CN Application No. 202080100064.2, Jan. 28, 2025, 4 pages.

\* cited by examiner

DEFAULT BEAM DETERMINATION IN CROSS-CARRIER SCHEDULING

FIELD

The subject matter disclosed herein generally relates to wireless communications, and more particularly relates to methods and apparatuses for determining default beam(s) for downlink signal reception transmitted from multiple TRPs with cross-carrier scheduling.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM), Radio Resource Control (RRC), Time-Division Duplex (TDD), Time Division Multiplex (TDM), User Entity/Equipment (Mobile Terminal) (UE), Uplink (UL), Universal Mobile Telecommunications System (UMTS), Physical Downlink Shared Channel (PDSCH), Physical Uplink Shared Channel (PUSCH), Physical Uplink Control Channel (PUCCH), Downlink control information (DCI), transmission reception point (TRP), multiple TRP (multi-TRP or M-TRP), frequency range 2 (FR2), Quasi Co-Location (QCL), channel state information reference signal (CSI-RS), Code Division Multiplexing (CDM), Transmission Configuration Indication (TCI), Control Resource Set (CORESET), reference signal (RS), component carrier (CC), band width part (BWP), Media Access Control (MAC), Control Element (CE), Demodulation Reference Signal (DM-RS).

Default TCI state or QCL assumption for reception of downlink signals, e.g. PDSCH and aperiodic CSI-RS resource(s), is an important feature in NR Release 15 and Release 16, when the scheduling or triggering time offset is less than a threshold determined according to UE capability. For example, for a PDSCH transmission scheduled by a DCI, the TCI state(s) for reception of the PDSCH can be indicated by the 'Transmission Configuration Indication' field (i.e. TCI field) contained in the DCI. However, when the time offset between the reception of the DCI scheduling a PDSCH and the reception of the scheduled PDSCH transmission is less than a threshold determined according to UE capability reporting (e.g. timeDurationForQCL), the UE will not have enough time to decode the DCI to obtain and change the TCI state for reception of the scheduled PDSCH and adjust the beam to correspond to the obtained TCI state. In this condition, a default TCI state has to be determined. In other words, the UE reported capability (e.g. timeDurationForQCL) indicates the time duration required by the UE for QCL determination.

Multi-DCI based multi-TRP DL transmission has been specified in NR Release 16. Multiple TRPs can schedule multiple PDSCH transmissions in a same carrier for a UE in one slot. TRP-specific TCI-states can be activated for a UE to support multi-DCI based multi-TRP DL transmission. A higher layer parameter CORESETPoolIndex can be configured for a CORESET to identify a TRP. Each activated TCI-state is associated with CORESETPoolIndex value. Cross-carrier DL scheduling is supported in NR Release 16 and a default QCL assumption is determined for DL reception when scheduling offset is less than a threshold. The default QCL assumption for single TRP is determined by the activated TCI state with lowest ID applicable to PDSCH. As different activated TCI states associated with different CORESETPoolIndex values are used for different TRPs, a wrong QCL assumption may be determined according to NR Release 15. The higher layer parameter CORESETPoolIndex should be taken account when determining the default TCI states for cross-carrier PDSCH and aperiodic CSI-RS reception.

This invention targets the default TCI state for cross-carrier PDSCH and aperiodic CSI-RS reception considering the potential multi-DCI based multi-TRP DL transmission.

BRIEF SUMMARY

Methods and apparatuses for determining default beam(s) are disclosed.

In one embodiment, a method comprises receiving a control signal scheduling or triggering a downlink signal, wherein the control signal is received on a first carrier, the downlink signal is received on a second carrier, the first carrier is different from the second carrier; and determining a default TCI state for reception of the downlink signal according to a higher layer parameter CORESETPoolIndex if the scheduling or triggering offset is less than a threshold.

In one embodiment, the downlink signal is PDSCH scheduled by DCI. When the higher layer parameter CORESETPoolIndex with different values is configured for both CORESETs configured on the first carrier and CORESETs configured on the second carrier, it may assume that the DM-RS ports of the scheduled PDSCH are quasi co-located with the RS(s) with respect to the QCL parameter(s) associated with the activated TCI state with the lowest ID applicable to PDSCH, which is associated with the same CORESETPoolIndex as the DCI scheduling the PDSCH, in the active BWP of the second carrier; when the higher layer parameter CORESETPoolIndex with different values is configured for CORESETs configured on the first carrier and the higher layer parameter CORESETPoolIndex is not configured for any CORESET configured on the second carrier, it may assume that the DM-RS ports of the scheduled PDSCH are quasi co-located with the RS(s) with respect to the QCL parameter(s) associated with the activated TCI state with the lowest ID applicable to PDSCH in the active BWP of the second carrier; and when the higher layer parameter CORESETPoolIndex is not configured for any CORESET configured on the first carrier and the higher layer parameter CORESETPoolIndex with different values is configured for CORESETs configured on the second carrier, it may assume that the DM-RS ports of the scheduled PDSCH are quasi co-located with the RS(s) with respect to the QCL parameter(s) associated with the activated TCI state with the lowest ID applicable to PDSCH associated with CORESET-PoonIndex=0 in the active BWP of the second carrier.

In another embodiment, the downlink signal is aperiodic CSI-RS triggered by DCI. When there are two scheduled PDSCHs associated with different CORESETPoolIndex values with indicated TCI states in the same symbol as the triggered aperiodic CSI-RS, (1) when the higher layer parameter CORESETPoolIndex with different values is configured for the CORESETs configured on the active BWP of the first carrier, when receiving the aperiodic CSI-RS, it may apply the QCL assumption of the scheduled PDSCH associated with the same CORESETPoolIndex value as the DCI triggering the aperiodic CSI-RS; (2) when the higher layer parameter CORESETPoolIndex is not configured for any CORESET configured on the active BWP of the first carrier, when receiving the aperiodic CSI-RS, it may apply the QCL assumption of the scheduled PDSCH associated with CORESETPoolIndex=0. When there is no other DL signal with an indicated TCI state in the same symbols as the triggered aperiodic CSI-RS, (1) when the higher layer parameter CORESETPoolIndex with different values is configured for both CORESETs configured on the first carrier and CORESETs configured on the second carrier, when receiving the aperiodic CSI-RS, it may apply the QCL assumption used for the CORESET associated with a monitored search space with the lowest ControlResourceSetId among the CORESETs, which are configured with the same value of CORESETPoolIndex as the DCI triggering the aperiodic CSI-RS, in the latest slot in which one or more CORESETs within the active BWP of the serving cell are monitored; (2) when the higher layer parameter CORESETPoolIndex with different values is configured for CORESETs configured on the first carrier and the higher layer parameter CORESETPoolIndex is not configured for any CORESET configured on the second carrier, when receiving the aperiodic CSI-RS, it may apply the QCL assumption used for the CORESET associated with a monitored search space with the lowest ControlResourceSetId in the latest slot in which one or more CORESETs within the active BWP of the serving cell are monitored; (3) when the higher layer parameter CORESETPoolIndex is not configured for any CORESET configured on the first carrier and the higher layer parameter CORESETPoolIndex with different values is configured for CORESETs configured on the second carrier, when receiving the aperiodic CSI-RS, it may apply the QCL assumption used for the CORESET associated with a monitored search space with the lowest ControlResourceSetId among the CORESETs, which are configured with CORESETPoolIndex=0, in the latest slot in which one or more CORESETs within the active BWP of the serving cell are monitored.

In some embodiment, when there is no other DL signal with an indicated TCI state in the same symbols as the triggered aperiodic CSI-RS, (1) when the higher layer parameter CORESETPoolIndex with different values is configured for the CORESETs configured on the active BWP of the first carrier and each of activated TCI states for PDSCH on the active BWP of the second carrier is associated a CORESETPoolIndex value, when receiving the aperiodic CSI-RS, it may apply the QCL assumption of the activated TCI state with the lowest ID associated with the same CORESETPoolIndex value as the DCI triggering the aperiodic CSI-RS applicable to PDSCH in the active BWP of the second carrier; (2) when the higher layer parameter CORESETPoolIndex is not configured for any CORESET configured on the active BWP of the first carrier and each of activated TCI states for PDSCH on the active BWP of the second carrier is associated with a CORESETPoolIndex value, when receiving the aperiodic CSI-RS, it may apply the QCL assumption of the activated TCI state with the lowest ID associated with CORESETPoolIndex=0 applicable to PDSCH in the active BWP of the second carrier (3) when the higher layer parameter CORESETPoolIndex with different values is configured for the CORESETs configured on the active BWP of the first carrier and no activated TCI states for PDSCH on the active BWP of the second carrier are associated with any CORESETPoolIndex value, when receiving the aperiodic CSI-RS, it may apply the QCL assumption of the activated TCI state with the lowest ID applicable to PDSCH in the active BWP of the second carrier.

In another embodiment, a remote unit comprises a receiver that receives a control signal scheduling or triggering a downlink signal, wherein the control signal is received on a first carrier, the downlink signal is received on a second carrier, the first carrier is different from the second carrier; and a processor that determines a default TCI state for reception of the downlink signal according to a higher layer parameter CORESETPoolIndex if the scheduling or triggering offset is less than a threshold.

In one embodiment, a method comprises transmitting a control signal scheduling or triggering a downlink signal, wherein the control signal is transmitted on a first carrier, the downlink signal is transmitted on a second carrier, the first carrier is different from the second carrier; and determining a default TCI state for transmission of the downlink signal according to a higher layer parameter CORESETPoolIndex if the scheduling or triggering offset is less than a threshold.

In yet another embodiment, a base unit comprises a transmitter that transmits a control signal scheduling or triggering a downlink signal, wherein the control signal is transmitted on a first carrier, the downlink signal is transmitted on a second carrier, the first carrier is different from the second carrier; and a processor that determines a default TCI state for transmission of the downlink signal according to a higher layer parameter CORESETPoolIndex if the scheduling or triggering offset is less than a threshold.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

A first embodiment relates to determining a default TCI state for cross-carrier PDSCH scheduling.

According to the first embodiment, the default TCI state for reception of the scheduled PDSCH is determined when the following three conditions are met:

(1) A DCI carried in PDCCH schedules a PDSCH transmission on a different carrier from that of the PDCCH (i.e. cross-carrier scheduled PDSCH). In other words, the PDCCH carrying the scheduling DCI is received on one component carrier, e.g. CC #1, while the PDSCH scheduled by that DCI is received on another component carrier, e.g. CC #2.

(2) The time offset between the reception of the DL DCI and the scheduled PDSCH is less than a threshold timeDurationForQCL. The threshold timeDurationForQCL is determined based on the subcarrier spacing of the scheduled PDSCH. If the sub-carrier space of the carrier transmitting the PDCCH ($\mu_{PDCCH}$) is smaller than the sub-carrier space of the carrier transmitting the PDSCH ($\mu_{PDSCH}$), i.e., $\mu_{PDCCH} < \mu_{PDSCH}$, an additional timing delay $$d * \frac{2^{\mu_{PDSCH}}}{2^{\mu_{PDCCH}}}$$

is added to the timeDurationForQCL, where d is defined as defined in NR Release 15.

(3) No matter whether or not tci-PresentInDCI or tci-PresentInDCI-ForFormat1_2 is configured for the CORESET transmitting the PDCCH carrying the DCI. That is, when tci-PresentInDCI is set as 'enabled' or tci-PresentInDCI-ForFormat1_2 is configured for the CORESET transmitting the PDCCH carrying the DCI, or when tci-PresentInDCI or tci-PresentInDCI-ForFormat1_2 is not configured for the CORESET transmitting the PDCCH carrying the DCI.

According to the first embodiment, the default TCI state for reception of the scheduled PDSCH is determined in three different situations.

Situation 1-1: the higher layer parameter CORESETPoolIndex with different values is configured for the CORESETs configured on both carriers. That is, the higher layer parameter CORESETPoolIndex with different values is configured for the CORESETs configured on the carrier on which the PDCCH carrying the scheduling DCI is received (i.e. on CC #1), and the higher layer parameter CORESETPoolIndex with different values is configured for the CORESETs configured on the carrier on which the PDSCH scheduled by the DCI is received (i.e. on CC #2). In situation 1-1, the UE may assume that the DM-RS ports of the scheduled PDSCH are quasi co-located (hereinafter, may be abbreviated as "QCLed") with the RS(s) with respect to the QCL parameter(s) associated with the activated TCI state with the lowest ID applicable to PDSCH, which is associated with the same CORESETPoolIndex value as that of the CORESET for the PDCCH carrying the DCI scheduling the PDSCH (may be abbreviated as "the same CORESETPoolIndex as the DCI scheduling the PDSCH"), in the active BWP of the scheduled carrier (i.e. CC #2).

Situation 1-2: the higher layer parameter CORESETPoolIndex with different values is configured for the CORESETs configured on the carrier on which the PDCCH carrying the scheduling DCI is received (i.e. on CC #1), and the higher layer parameter CORESETPoolIndex is not configured for any CORESET configured on the carrier on which the PDSCH scheduled by that DCI is received (i.e. on CC #2). In situation 1-2, the UE may assume that the DM-RS ports of the scheduled PDSCH are QCLed with the RS(s) with respect to the QCL parameter(s) associated with the activated TCI state with the lowest ID applicable to PDSCH in the active BWP of the scheduled carrier (i.e. CC #2).

Situation 1-3: the higher layer parameter CORESETPoolIndex is not configured for any CORESET configured on the carrier on which the PDCCH carrying the scheduling DCI is received (i.e. on CC #1), and the higher layer parameter CORESETPoolIndex with different values is configured for the CORESETs configured on the carrier on which the PDSCH scheduled by that DCI is received (i.e. on CC #2). In situation 1-3, the UE may assume that the DM-RS ports of the scheduled PDSCH are QCLed with the RS(s) with respect to the QCL parameter(s) associated with the activated TCI state with the lowest ID applicable to PDSCH, which is associated with the lowest CORESET- PoonIndex (i.e. CORESETPoonIndex=0), in the active BWP of the scheduled carrier (i.e. CC #2).

The expression "are QCLed with the RS(s) with respect to the QCL parameter(s) associated with the TCI state" is further explained as follows:

The UE can be configured with a list of up to M TCI state configurations to decode PDSCH according to a detected PDCCH with DCI intended for the UE and the given serving cell, where M depends on the UE capability. The TCI state is configured by the following RRC signaling:

```
-        TCI state
The IE TCI state associates one or two DL reference signals with a corresponding quasi-
colocation (QCL) type.
                        TCI state information element
-- ASN1START
-- TAG-TCI STATE-START
TCI state ::=            SEQUENCE {
  TCI stateId              TCI stateId,
  qcl-Type1                QCL-Info,
  qcl-Type2                QCL-Info
OPTIONAL, -- Need E
  ...
}
QCL-Info ::=             SEQUENCE {
  cell                     ServCellIndex
OPTIONAL, -- Need R
  bwp-Id                   BWP-Id
OPTIONAL, -- Cond CSI-RS-Indicated
  referenceSignal          CHOICE {
    csi-rs                   NZP-CSI-RS-ResourceId,
    ssb                      SSB-Index
  },
  qcl-Type                 ENUMERATED {typeA, typeB, typeC, typeD},
  ...
}
-- TAG-TCI STATE-STOP
-- ASN1STOP
```

Each TCI state contains parameters for configuring a quasi co-location (QCL) relationship between one or two downlink reference signals (i.e. RS(s)) and the DM-RS ports of the PDSCH, the DM-RS port of PDCCH or the CSI-RS port(s) of a CSI-RS resource. The quasi co-location relationship is configured by the higher layer parameter qcl-Type1 for the first downlink RS, and qcl-Type2 for the second downlink RS (if configured). For the case of two downlink RSs, the QCL types shall not be the same, regardless of whether the references are to the same downlink RS or different downlink RSs. The quasi co-location types (i.e. QCL parameter(s)) corresponding to each downlink RS are given by the higher layer parameter qcl-Type in QCL Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a TCI state is configured as TCI state={CSI-RS #1, QCL-TypeA; CSI-RS #2, QCL-TypeD} and it is indicated for a PDSCH reception, it means that the UE may assume that the Doppler shift, Doppler spread, average delay, delay spread for the DM-RS ports of the PDSCH are the same as those estimated by CSI-RS #1 and the UE may receive the PDSCH and the corresponding DM-RS port using the same spatial RX parameter as that used to receive CSI-RS #2. We can say that "the UE may assume that the DM-RS ports of the scheduled PDSCH are quasi co-located (i.e. QCLed) with CSI-RS #1 with respect to 'QCL-TypeA', and quasi co-located with CSI-RS #2 with respect to 'QCL-TypeD' (or abbreviated as "QCLed with the RS(s) with respect to the QCL parameter(s) associated with the activated TCI state"). In other words, the QCL assumption of the DM-RS ports of the scheduled PDSCH (for reception of the PDSCH) is determined according to the activated TCI state.

An example of the first embodiment is described as follows:

Five CORESETs, e.g. CORESET #1, CORESET #2, CORESET #3, CORESET #4 and CORESET #5 are configured for the active BWP of the serving cell CC #2 (i.e. the carrier on which the PDSCH scheduled by DCI is received) for a UE, a higher layer parameter CORESETPoolIndex=0 is configured for CORESET #1, CORESET #2 and CORESET #3, and CORESETPoolIndex=1 is configured for CORESET #4 and CORESET #5. {TCI-state #2, TCI-state #5, TCI-state #8, TCI-state #12, TCI-state #18, TCI-state #23, TCI-state #28, TCI-state #32} are activated for CORESETPoolIndex=0 for the active BWP of the serving cell CC #2, and {TCI-state #42, TCI-state #45, TCI-state #48, TCI-state #52, TCI-state #58, TCI-state #63, TCI-state #68, TCI-state #72} are activated for CORESETPoolIndex=1 for the active BWP of the serving cell CC #2.

If a UE receives a DCI carried by PDCCH from a CORESET configured with CORESETPoolIndex=1 on CC #1 (i.e. the carrier on which the PDCCH carrying the DCI is received) scheduling a PDSCH transmission on CC #2, when the scheduling offset is less than the threshold, the UE may assume that the DM-RS ports of the scheduled PDSCH are QCLed with the RS(s) with respect to the QCL parameter(s) associated with the activated TCI state with the lowest ID applicable to PDSCH in the active BWP of CC #2 associated with CORESETPoonIndex=1, i.e. TCI-state #42. This is an example of the situation 1-1.

If CORESETPoolIndex is not configured for any CORESET configured on the active BWP of CC #1 and the UE receives a DCI carried by PDCCH on CC #1 scheduling a PDSCH transmission on CC #2, when the scheduling offset is less than the threshold, the UE may assume that the DM-RS ports of the scheduled PDSCH are QCLed with the RS(s) with respect to the QCL parameter(s) associated with the activated TCI state with the lowest ID applicable to PDSCH in the active BWP of CC #2 associated with CORESETPoonIndex=0, i.e. TCI-state #2. This is an example of the situation 1-3.

A second embodiment to a fifth embodiment relate to determining a default TCI state for cross-carrier triggering aperiodic CSI-RS.

According to the second to the fifth embodiments, the default TCI state for reception of the triggered aperiodic CSI-RS is determined when the following two conditions are met:

(1) A DCI carried in PDCCH triggers an aperiodic CSI-RS transmission on a different carrier from that of the PDCCH (i.e. cross-carrier triggered aperiodic CSI-RS). In other words, the PDCCH carrying the triggering DCI is received on one component carrier, e.g. CC #1, while the aperiodic CSI-RS resource triggered by that DCI is received on another component carrier, e.g. CC #2.

(2) The sub-carrier space of the carrier transmitting the PDCCH ($\mu_{PDCCH}$) is smaller than the sub-carrier space of the carrier transmitting the CSI-RS ($\mu_{CSIRS}$), i.e. $\mu_{PDCCH} < \mu_{CSIRS}$. The triggering offset between the last symbol of the PDCCH carrying the triggering DCI and the first symbol of the aperiodic CSI-RS resources configured without higher layer parameter trs-Info and without higher layer parameter repetition is smaller than the UE reported threshold $$beamSwitchTiming + d^* \frac{2^{\mu_{PDSCH}}}{2^{\mu_{PDCCH}}}$$

in unit of CSI-RS symbols. The reported value of beamSwitchTiming indicates the time duration for the UE for beam switching and is one of the values of {14, 28, 48}. The beam switching timing delay d is defined in the following table (Table 5.2.1.5.1a-1 of TS38.214):

TABLE 5.2.1.5.1a-1

Additional beam switching timing delay d

| $\mu_{PDCCH}$ | d [PDCCH symbols] |
|---|---|
| 0 | 8 |
| 1 | 8 |
| 2 | 14 |

In the second embodiment, there is one scheduled PDSCH with an indicated TCI state in the same symbol as the CSI-RS. Further, the PDSCH is scheduled with a timing offset larger than or equal to the threshold timeDurationForQCL.

According to the second embodiment, when receiving the triggered aperiodic CSI-RS, the UE may apply the QCL assumption of the scheduled PDSCH (i.e. the TCI state for the scheduled PDSCH).

In the third embodiment, there are two PDSCHs scheduled by DCIs transmitted from different CORESETs configured with different CORESETPoolIndex values with indicated TCI states in the same symbol as the CSI-RS. Further, each of the two PDSCHs is scheduled with a timing offset larger than or equal to the threshold timeDurationForQCL.

According to the third embodiment, the default TCI state for reception of the triggered aperiodic CSI-RS is determined in two different situations.

Situation 3-1: the higher layer parameter CORESET-PoolIndex with different values is configured for the CORESETs configured on the active BWP of CC #1 (the carrier on which the PDCCH carrying the triggering DCI is received). In situation 3-1, the UE may apply the QCL assumption of (i.e. the TCI state indicated for) the PDSCH scheduled by a DCI transmitted from a CORESET configured with the same CORESETPoolIndex value as that of the CORESET for the PDCCH carrying the DCI triggering the aperiodic CSI-RS (may be abbreviated as "the same CORESETPoolIndex value as the DCI triggering the aperiodic CSI-RS"), for reception of the triggered aperiodic CSI-RS.

Situation 3-2: the higher layer parameter CORESET-PoolIndex is not configured for any CORESET configured on the active BWP of CC #1. The UE may apply the QCL assumption of (i.e. the TCI state indicated for) the PDSCH scheduled by a DCI transmitted from a CORESET configured with the lowest CORESETPoolIndex (i.e. CORESETPoolIndex=0) for reception of the triggered aperiodic CSI-RS.

An example of the situation 3-1 is as follows:

A UE receives a DCI carried in PDCCH from a CORESET configured with CORESETPoolIndex=1 on CC #1 triggering an aperiodic CSI-RS transmission on CC #2. There are two PDSCH transmissions (e.g. PDSCH transmission #1 and PDSCH transmission #2). PDSCH transmission #1 is scheduled by DCI #1 from CORESET configured with CORESETPoolIndex=0 and PDSCH transmission #2 is scheduled by DCI #2 from CORESET configured with CORESETPoolIndex=1. If the triggering offset for the aperiodic CSI-RS is less than the threshold, the UE applies the TCI state indicated for PDSCH transmission #2, as the default TCI state for reception of the triggered aperiodic CSI-RS.

In the fourth embodiment, there is no other DL signal with an indicated TCI state in the same symbols as the CSI-RS, and at least one CORESET is configured for the BWP in which the aperiodic CSI-RS is to be transmitted.

The other DL signal refers to any one of: PDSCH scheduled with a scheduling offset larger than or equal to the threshold timeDurationForQCL, as defined in [13, TS 38.306]; aperiodic CSI-RS triggered with a triggering offset larger than or equal to the UE reported threshold $$beamSwitchTiming + d^* \frac{2^{\mu_{PDSCH}}}{2^{\mu_{PDCCH}}}$$

in CSI-RS symbols when the reported value is one of the values {14,28,48}; aperiodic CSI-RS triggered with a triggering offset larger than or equal to 48+d when the reported value of beamSwitchTiming is one of the values {224, 336}; periodic CSI-RS; and semi-persistent CSI-RS.

According to the fourth embodiment, the default TCI state for reception of the triggered aperiodic CSI-RS is determined in three different situations.

Situation 4-1: the higher layer parameter CORESET-PoolIndex with different values is configured for the CORESETs configured on both carriers. That is, the higher layer parameter CORESETPoolIndex with different values is configured for the CORESETs configured on the carrier on which the PDCCH carrying the triggering DCI is received (i.e. on CC #1), and the higher layer parameter CORESET-PoolIndex with different values is configured for the CORESETs configured on the carrier on which the aperiodic CSI-RS triggered by that DCI is received (i.e. on CC #2). In situation 4-1, the UE may apply, when receiving the aperiodic CSI-RS, the QCL assumption used for (i.e. the TCI state indicated for) the CORESET associated with a monitored search space with the lowest ControlResourceSetId among the CORESETs, which are configured with the same value of CORESETPoolIndex as that of the CORESET for the PDCCH carrying the DCI triggering the aperiodic CSI-RS (may be abbreviated as "the same value of CORESETPoolIndex as the DCI triggering the aperiodic CSI-RS") in the latest slot in which one or more CORESETs within the active BWP of the serving cell are monitored.

Situation 4-2: the higher layer parameter CORESETPoolIndex with different values is configured for the CORESETs configured on the carrier on which the PDCCH carrying the triggering DCI is received (i.e. on CC #1), and the higher layer parameter CORESETPoolIndex is not configured for any CORESET configured on the carrier on which the aperiodic CSI-RS triggered by that DCI is received (i.e. on CC #2). In situation 4-2, the UE may apply, when receiving the aperiodic CSI-RS, the QCL assumption used for (i.e. the TCI state indicated for) the CORESET associated with a monitored search space with the lowest ControlResourceSetId in the latest slot in which one or more CORESETs within the active BWP of the serving cell are monitored.

Situation 4-3: the higher layer parameter CORESETPoolIndex is not configured for any CORESET configured on the carrier on which the PDCCH carrying the triggering DCI is received (i.e. on CC #1), and the higher layer parameter CORESETPoolIndex with different values is configured for the CORESETs configured on the carrier on which the aperiodic CSI-RS triggered by that DCI is received (i.e. on CC #2). In situation 4-3, the UE may apply, when receiving the aperiodic CSI-RS, the QCL assumption used for (i.e. the TCI state indicated for) the CORESET associated with a monitored search space with the lowest ControlResourceSetId among the CORESETs, which are configured with the lowest CORESETPoolIndex (i.e. CORESETPoolIndex=0) in the latest slot in which one or more CORESETs within the active BWP of the serving cell are monitored.

In the fifth embodiment, there is no other DL signal with an indicated TCI state in the same symbols as the CSI-RS, and no CORESET is configured for the BWP in which the aperiodic CSI-RS is to be received The other DL signal refers to any one of: PDSCH scheduled with a scheduling offset larger than or equal to the threshold timeDurationForQCL, as defined in [13, TS 38.306]; aperiodic CSI-RS triggered with a triggering offset larger than or equal to the UE reported threshold $$beamSwitchTiming + d^* \frac{2^{\mu_{PDSCH}}}{2^{\mu_{PDCCH}}}$$

in CSI-RS symbols when the reported value is one of the values {14,28,48}; aperiodic CSI-RS triggered with a triggering offset larger than or equal to 48+d when the reported value of beamSwitchTiming is one of the values {224, 336}; periodic CSI-RS; and semi-persistent CSI-RS.

According to the fifth embodiment, the default TCI state for reception of the triggered aperiodic CSI-RS is determined in three different situations.

Situation 5-1: the higher layer parameter CORESETPoolIndex with different values is configured for the CORESETs configured on the active BWP of CC #1 (the carrier on which the PDCCH carrying the triggering DCI is received) and each of activated TCI states for PDSCH on the active BWP of CC #2 (the carrier on which the aperiodic CSI-RS triggered by that DCI is received) is associated a CORESETPoolIndex value. In situation 5-1, the UE may apply, when receiving the aperiodic CSI-RS, the QCL assumption corresponding to the activated TCI state with the lowest ID associated with the same CORESETPoolIndex value as that of the CORESET for the PDCCH carrying the DCI triggering the aperiodic CSI-RS (may be abbreviated as "the same CORESETPoolIndex value as the DCI triggering the aperiodic CSI-RS") applicable to PDSCH in the active BWP of the triggered carrier (i.e. CC #2).

Situation 5-2: the higher layer parameter CORESETPoolIndex is not configured for any CORESET configured on the active BWP of CC #1 and each of activated TCI states for PDSCH on the active BWP of CC #2 is associated with a CORESETPoolIndex value. In situation 5-2, the UE may apply, when receiving the aperiodic CSI-RS, the QCL assumption corresponding to the activated TCI state with the lowest ID associated with CORESETPoolIndex=0 applicable to PDSCH in the active BWP of the triggered carrier (i.e. CC #2).

Situation 5-3: the higher layer parameter CORESETPoolIndex is configured for the CORESETs configured on the active BWP of CC #1 and no activated TCI states for PDSCH on the active BWP of CC #2 are associated with any CORESETPoolIndex value. In situation 5-3, the UE may apply, when receiving the aperiodic CSI-RS, the QCL assumption corresponding to the activated TCI state with the lowest ID applicable to PDSCH in the active BWP of the triggered carrier (i.e. CC #2).

In all of the above embodiments, the invention is described from the point of view of UE. That is, the DCI scheduling PDSCH or triggering aperiodic CSI-RS is received at the UE; and the scheduled PDSCH and/or the triggered aperiodic CSI-RS are received at the UE. On the other hand, from the point of view of gNB (base station), the DCI scheduling PDSCH or triggering aperiodic CSI-RS is transmitted from the gNB; and the scheduled PDSCH and the triggered aperiodic CSI-RS are transmitted from the gNB.

Figure 1:
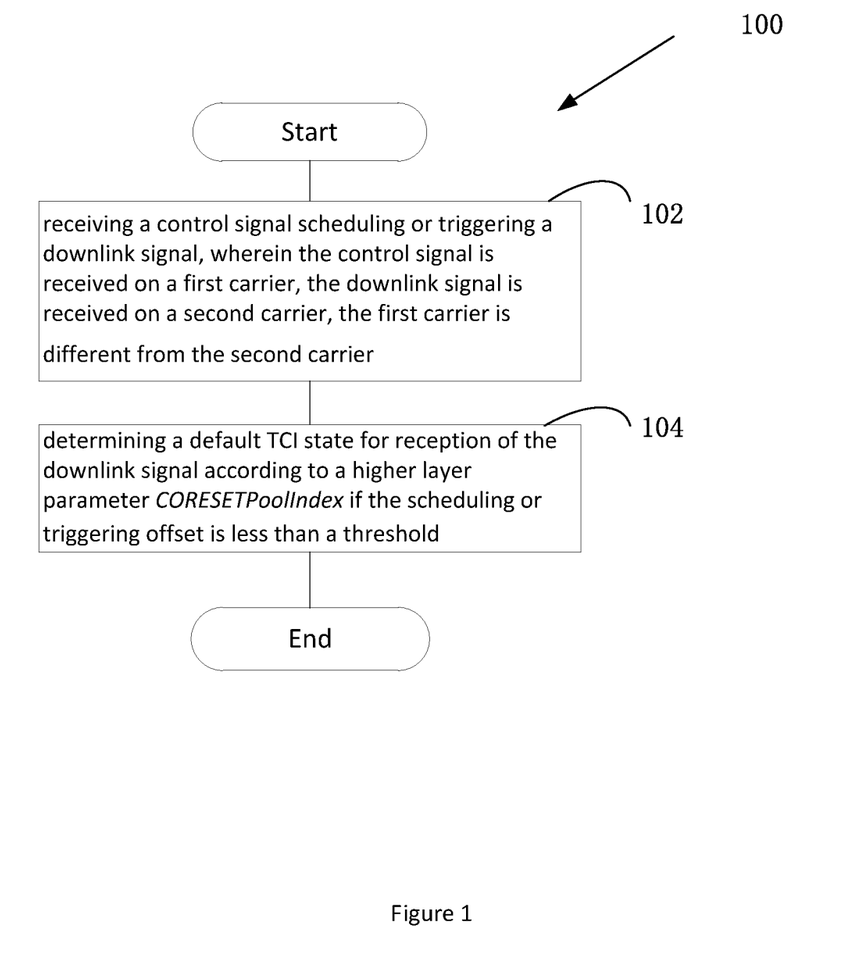
FIG. 1 is a schematic flow chart diagram illustrating an embodiment of a method.

FIG. 1 is a schematic flow chart diagram illustrating an embodiment of a method 100 according to the present application. In some embodiments, the method 100 is performed by an apparatus, such as a remote unit. In certain embodiments, the method 100 may be performed by a processor executing program code, for example, a microcontroller, a microprocessor, a CPU, a GPU, an auxiliary processing unit, a FPGA, or the like.

The method 100 may include 102 receiving a control signal scheduling or triggering a downlink signal, wherein the control signal is received on a first carrier, the downlink signal is received on a second carrier, the first carrier is different from the second carrier; and 104 determining a default TCI state for reception of the downlink signal according to a higher layer parameter CORESETPoolIndex if the scheduling or triggering offset is less than a threshold.

Figure 2:
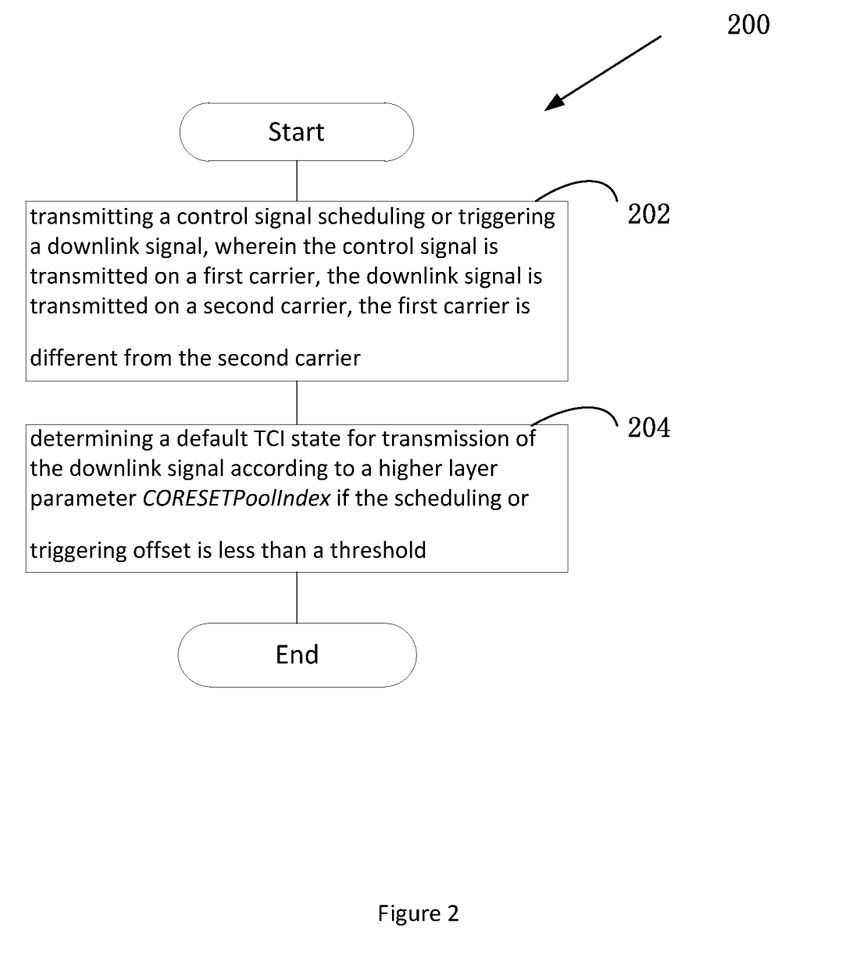
FIG. 2 is a schematic flow chart diagram illustrating a further embodiment of a method.

FIG. 2 is a schematic flow chart diagram illustrating an embodiment of a method 200 according to the present application. In some embodiments, the method 200 is performed by an apparatus, such as a base unit. In certain embodiments, the method 200 may be performed by a processor executing program code, for example, a microcontroller, a microprocessor, a CPU, a GPU, an auxiliary processing unit, a FPGA, or the like.

The method 200 may include 202 transmitting a control signal scheduling or triggering a downlink signal, wherein the control signal is transmitted on a first carrier, the downlink signal is transmitted on a second carrier, the first carrier is different from the second carrier; and 204 determining a default TCI state for transmission of the downlink signal according to a higher layer parameter CORESET-PoolIndex if the scheduling or triggering offset is less than a threshold.

Figure 3:
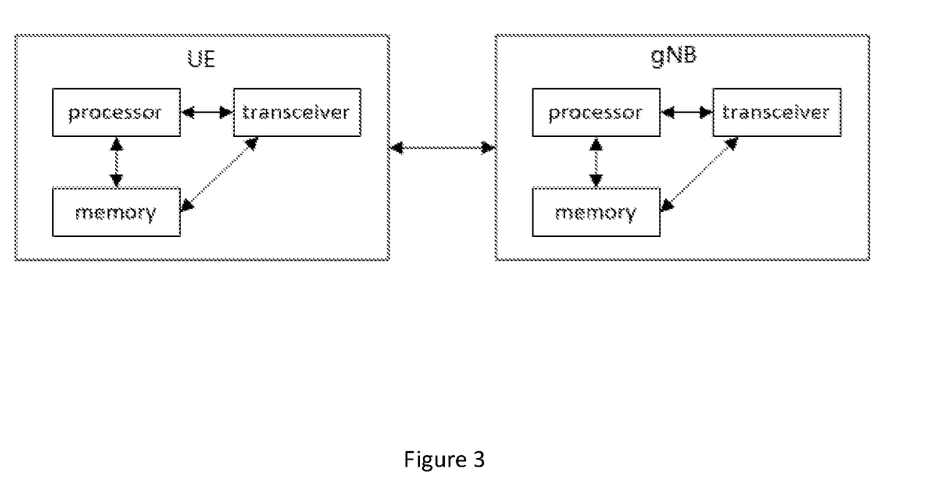
FIG. 3 is a schematic block diagram illustrating apparatuses according to one embodiment.

FIG. 3 is a schematic block diagram illustrating apparatuses according to one embodiment.

Referring to FIG. 3, the UE (i.e. the remote unit) includes a processor, a memory, and a transceiver. The processor implements a function, a process, and/or a method which are proposed in FIG. 1. The gNB (i.e. base unit) includes a processor, a memory, and a transceiver. The processors implement a function, a process, and/or a method which are proposed in FIG. 2. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
    receiving a control signal scheduling or triggering a downlink signal, wherein the control signal is received on a first carrier, the downlink signal is received on a second carrier, and the first carrier is different from the second carrier;
    determining a default transmission configuration indication (TCI) state for reception of the downlink signal according to a higher layer parameter control resource set (CORESET)PoolIndex if a scheduling offset or a triggering offset is less than a threshold, wherein the downlink signal is an aperiodic channel state information reference signal (CSI-RS) triggered by downlink control information (DCI); and
    when two scheduled physical downlink shared channels (PDSCHs) associated with different CORESETPoolIndex values with indicated TCI states are in a same symbol as the triggered aperiodic CSI-RS and the higher layer parameter CORESETPoolIndex with the different CORESETPoolIndex values is configured for CORESETs configured on an active bandwidth part (BWP) of the first carrier, applying, for reception of the aperiodic CSI-RS, a quasi-co-location (QCL) assumption of the scheduled PDSCH associated with a same CORESETPoolIndex value as the DCI triggering the aperiodic CSI-RS.

2. The method of claim 1, further comprising when the higher layer parameter CORESETPoolIndex is not configured for any CORESET configured on an active BWP of the first carrier, applying a QCL assumption of the scheduled PDSCH associated with CORESETPoolIndex=0.

3. A user equipment (UE) for wireless communication, comprising:
    at least one memory; and
    at least one processor coupled to the at least one memory and configured to cause the UE to:
        receive a control signal scheduling or triggering a downlink signal, wherein the control signal is received on a first carrier, the downlink signal is received on a second carrier, and the first carrier is different from the second carrier;
        determine a default transmission configuration indication (TCI) state for reception of the downlink signal according to a higher layer parameter control resource set (CORESET)PoolIndex if a scheduling offset or a triggering offset is less than a threshold, wherein the downlink signal is an aperiodic channel state information reference signal (CSI-RS) triggered by downlink control information (DCI); and
        when no other downlink signal with an indicated TCI state is in a same symbol as the triggered aperiodic CSI-RS and the higher layer parameter CORESET-PoolIndex has different values configured for first CORESETs configured on the first carrier and second CORESETs configured on the second carrier, apply, for reception of the aperiodic CSI-RS, a quasi-co-location (QCL) assumption used for a CORESET associated with a monitored search space having a lowest ControlResourceSetId among the first and second CORESETs configured with a same value of CORESETPoolIndex as the DCI triggering the aperiodic CSI-RS, in a latest slot in which one or more of the CORESETs within an active bandwidth part (BWP) of a serving cell are monitored.

4. A base station for wireless communication, comprising:
    at least one memory; and
    at least one processor coupled to the at least one memory and configured to cause the base station to:
        transmit a control signal scheduling or triggering a downlink signal, wherein the control signal is transmitted on a first carrier, the downlink signal is transmitted on a second carrier, and the first carrier is different from the second carrier;
        determine a default transmission configuration indication (TCI) state for transmission of the downlink signal according to a higher layer parameter control resource set (CORESET)PoolIndex if a scheduling offset or a triggering offset is less than a threshold, wherein the downlink signal is an aperiodic channel state information reference signal (CSI-RS) triggered by downlink control information (DCI); and when two scheduled physical downlink shared channels (PDSCHs) associated with different CORESETPoolIndex values with indicated TCI states are in a same symbol as the triggered aperiodic CSI-RS and the higher layer parameter CORESETPoolIndex with the different CORESETPoolIndex values is configured for CORESETs configured on an active bandwidth part (BWP) of the first carrier, applying, for transmission of the aperiodic CSI-RS, a quasi-co-location (QCL) assumption of the scheduled PDSCH associated with a same CORESETPoolIndex value as the DCI triggering the aperiodic CSI-RS.

5. A method performed by a base station, the method comprising:

transmitting a control signal scheduling or triggering a downlink signal, wherein the control signal is transmitted on a first carrier, the downlink signal is transmitted on a second carrier, and the first carrier is different from the second carrier;

determining a default transmission configuration indication (TCI) state for transmission of the downlink signal according to a higher layer parameter control resource set (CORESET)PoolIndex if a scheduling offset or a triggering offset is less than a threshold, wherein the downlink signal is an aperiodic channel state information reference signal (CSI-RS) triggered by downlink control information (DCI); and when no other downlink signal with an indicated TCI state is in a same symbol as the triggered aperiodic CSI-RS and the higher layer parameter CORESETPoolIndex has different values configured for first CORESETs configured on the first carrier and second CORESETs configured on the second carrier, applying, for transmission of the aperiodic CSI-RS, a quasi-co-location (QCL) assumption used for a CORESET associated with a monitored search space having a lowest ControlResourceSetId among the first and second CORESETs configured with a same value of CORESETPoolIndex as the DCI triggering the aperiodic CSI-RS, in a latest slot in which one or more of the CORESETs within an active bandwidth part (BWP) of a serving cell are monitored.

6. The method of claim 5, further comprising when the higher layer parameter CORESETPoolIndex is not configured for any CORESET configured on an active BWP of the first carrier, applying QCL assumption of the scheduled PDSCH associated with CORESETPoolIndex=0.

* * * * *